(12) United States Patent
Oliver

(10) Patent No.: US 7,253,838 B2
(45) Date of Patent: *Aug. 7, 2007

(54) GIMBAL OPTICAL SYSTEM FOR DOCUMENT IMAGE CAPTURE

(75) Inventor: Thomas C Oliver, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

This patent is subject to a terminal disclaimer.

(21) Appl. No.: 10/454,194

(22) Filed: Jun. 3, 2003

(65) Prior Publication Data

US 2003/0193612 A1    Oct. 16, 2003

Related U.S. Application Data

(63) Continuation of application No. 09/311,527, filed on May 13, 1999, now Pat. No. 6,667,772.

(51) Int. Cl.
*H04N 5/225* (2006.01)

(52) U.S. Cl. .................. 348/345; 348/207.99; 348/335
(58) Field of Classification Search .......... 348/207.99, 348/143, 335; 358/471, 473
See application file for complete search history.

(56) References Cited

U.S. PATENT DOCUMENTS

| 4,788,596 A | * | 11/1988 | Kawakami et al. .... 348/208.11 |
| 5,502,598 A | * | 3/1996 | Kimura et al. ............... 359/814 |
| 6,476,856 B1 | * | 11/2002 | Zantos ........................ 348/151 |

* cited by examiner

*Primary Examiner*—Tuan Ho

(57) ABSTRACT

An imaging device for document imaging may comprise a housing and an optical system having a lens system and an optical detector. The optical system is responsive to image light reflected by an object and produces image data representative of the image light. The optical system is pivotally mounted to said housing and is biased toward a vertical orientation inside said housing by gravity.

2 Claims, 6 Drawing Sheets

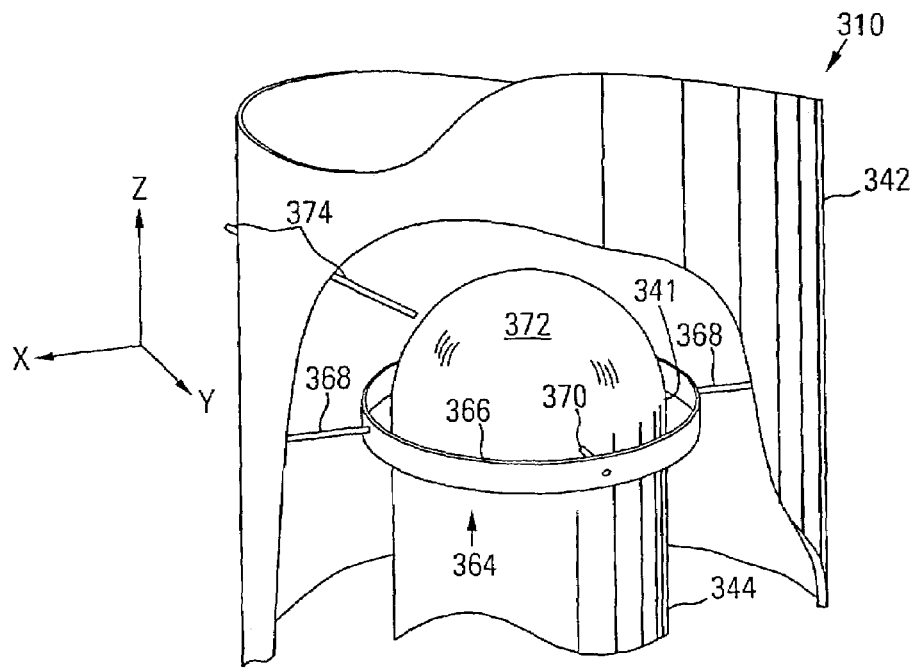
FIG. 5
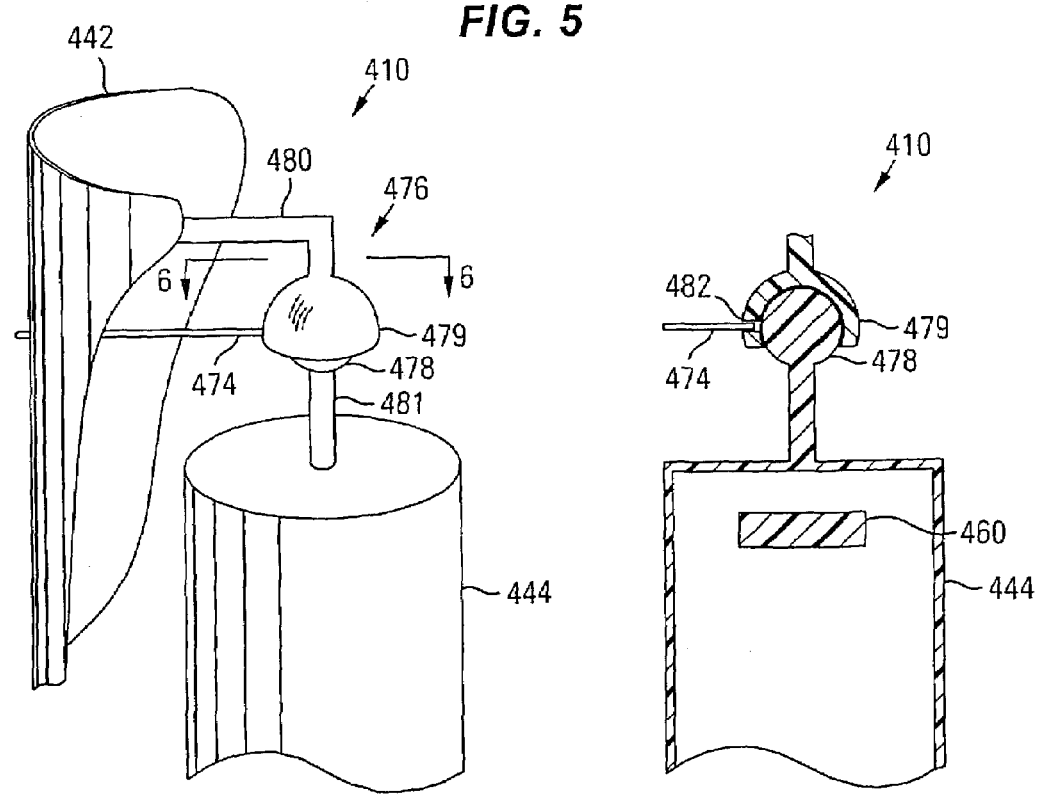
FIG. 6  FIG. 7

GIMBAL OPTICAL SYSTEM FOR DOCUMENT IMAGE CAPTURE

CROSS REFERENCE TO RELATED APPLICATION

This is a continuation of application Ser. No. 09/311,527 filed on May 13, 1999, which is hereby incorporated by reference herein.

FIELD OF THE INVENTION

The present invention relates generally to the field of document imaging, and more particularly, to a system and method for vertically orienting an optical path in a digital camera.

BACKGROUND OF THE INVENTION

Imaging devices such as optical cameras and scanners are well known in the art and may be used to quickly and easily capture the image of a document for numerous applications. The images may be processed and stored either chemically on photographic paper, or electronically in the form of electrical signals, either analog or digital. As computer use becomes more prevalent, document imaging is becoming more important and widespread. In a typical digital camera or scanner application, the image data signals produced by the camera or scanner may be used by a personal computer to reproduce an image of the object on a suitable display device, such as a CRT or a printer.

A hand-held or portable digital camera is a digital camera which is designed to be hand held and pointed at the object or document being imaged. A hand-held or portable optical scanner is an optical scanner which is designed to be moved by hand across the object or document being scanned. The imaging device, either digital camera or scanner, may be connected directly to a separate computer either by a data cable or wireless data link. If so, the data signals produced by the imaging device may be transferred to the separate computer "on the fly," i.e., as the image data are collected. Alternatively, the imaging device may include an on-board data storage system for storing the image data. The image data may then be downloaded to a separate computer after the scanning operation is complete by any convenient means, such as via a cable or an optical infrared data link.

Digital cameras are well-known in the art and various components thereof are described in U.S. patent application, Ser. No. 09/189,128, for TWO PIECE SYSTEM FOR DOCUMENT IMAGE CAPTURE of Thomas C. Oliver, U.S. patent application, Ser. No. 09/295,865, for DIGITAL CAMERA WITH INERTIAL POSITION SENSING of David D. Bohn U.S. Pat. No. 4,131,919, U.S. Pat. No. 4,420,773, and U.S. Pat. No. 4,541,010, all of which are hereby incorporated by reference for all that they disclose.

A typical hand-held digital camera or optical scanner may include illumination and optical systems to accomplish imaging of the object. The illumination system illuminates all or a portion of the object, whereas the optical system collects light reflected by the illuminated target region and focuses the reflected light onto the surface of a photosensitive detector positioned within the imaging device. By way of example, the illumination system may include a light source (e.g., a fluorescent or incandescent lamp or an array of light emitting diodes (LEDs)). The optical system may include a lens and/or mirror assembly to direct and focus the image of the illuminated target region along the optical axis of the optical system onto the surface of the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

The term "image light" as used herein refers to the light that is focused onto the surface of the detector array by the optical system. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital data then may be processed and/or stored as desired.

Portable imaging devices of the type described above are not without their problems. For example, when a portable imaging device is positioned over a document, it is difficult, if not impossible, to perfectly orient the imaging device by hand so that the optical axis is perpendicular to the document. The task is easier with portable scanners which may comprise a flat base to hold against the document. However, as portable scanners become smaller, their bases become increasingly narrow and correct orientation becomes more difficult.

If the imaging device is not held with the optical axis perpendicular to the document face, the resulting image of the document will be stretched and may be blurry and illegible. When the imaging device is not perpendicular, (i.e., is held at an angle other than 90° to the document face), one area of the document is closer to the imaging device's photosensitive detector than the other. Portions of the document which are closer to the imaging device will appear larger, or zoomed in, in the final image. Portions of the document which are farther from the imaging device will appear smaller, or zoomed out, in the final image. The image will also appear compressed along an axis between the closer area and the more distant area. For example, a circle on the document would appear elliptical, or a square on the document would appear rectangular or trapezoidal in the resulting image. Finally, depending upon the depth of field of the imaging device's optical system, portions of the final image may be out of focus.

Digital cameras may be held in place over a document with a fixture such as a tripod or bracket to help hold them in a given orientation. However, it is difficult to properly orient a digital camera even when held in such a fixture if the fixture allows for angular adjustment, as most common tripods do. Some tripods include an air bubble tilt meter, but bubble meters are not very accurate and offer no feedback for large angles when the bubble moves beyond the viewable window. Furthermore, the usefulness and portability of a digital camera requiring a tripod or fixture for document imaging is greatly limited.

A need therefore exists for a system to automatically maintain a vertical orientation of the optical axis in an imaging device, perpendicular to a document positioned below the imaging device. A need further exists for a system allowing the imaging device to be used in non-vertical applications as well as document imaging.

SUMMARY

To assist in achieving the aforementioned needs, the inventor has devised an electronic imaging device having an optical assembly pivotally mounted therein. The pivot mount allows the optical assembly to be pulled by gravity into a vertical orientation over a document. This improves image quality by aligning the optical axis of the optical assembly perpendicularly with respect to the document, preventing image distortion.

An imaging device for document imaging having features of the present invention may comprise a housing and an optical system having a lens system and an optical detector. The optical system is responsive to image light reflected by an object and produces image data representative of the image light. The optical system is pivotally mounted to said housing and is biased toward a vertical orientation inside said housing by gravity.

The invention may also comprise an electronic imaging assembly comprising a body portion, an imaging means for focusing, directing, and sensing image light, and a mounting means. The first means is pivotally mounting to the body portion by the mounting means so that the imaging means may be pulled by gravity around the mounting means to vertically orient an optical axis of the imaging means.

The invention may also comprise a digital camera comprising a body portion, a gimbal mounted to the body portion, and an optical system mounted in the gimbal so that the optical system is free to pivot under the force of gravity in the body portion.

The invention may also comprise an imaging device for document imaging, comprising a body portion, an optical assembly, and a pivotal mounting bracket, whereby the optical assembly is pivotally mounted to the body portion. The imaging device also comprises a lock having a locked position and an unlocked position. The optical assembly may be locked into place relative to the body portion when the lock is in the locked position. The optical assembly may pivot about the pivotal mounting bracket when the lock is in the unlocked position.

BRIEF DESCRIPTION OF THE DRAWING

Illustrative and presently preferred embodiments of the invention are shown in the drawing, in which:

FIG. 5 is a perspective cutaway view of a digital camera showing a gimbal mounted optical system with a friction lock;

FIG. 6 is a perspective cutaway view of a digital camera showing a ball and socket mounted optical system;

FIG. 7 is a cross-sectional view of the digital camera of FIG. 5;

DESCRIPTION OF THE PREFERRED EMBODIMENTS

Figure 1:
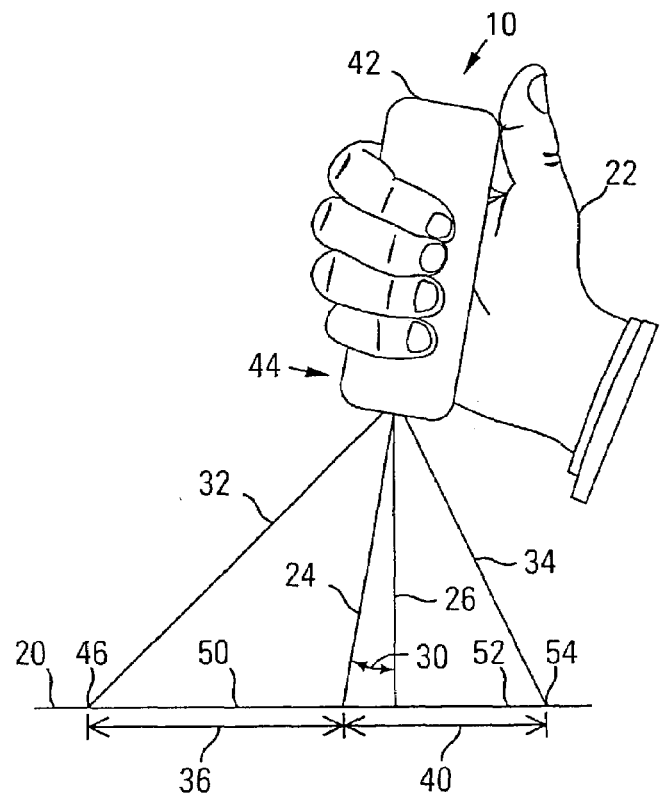
FIG. 1 is a front view of a digital camera as it may be used for document imaging, having a tilted orientation.

An electronic imaging device 10 may be used to detect and store the image of an object in electrical form. Typical types of electronic imaging devices include digital cameras and scanners. As digital cameras and scanners have become more portable and computers have become more widely used, document imaging has developed into a very useful tool. A document 20 which may contain both text and graphics may be electronically photographed or scanned, and the resulting image transferred to a computer, manipulated, combined with other documents or information, and printed or transferred across networks to computers across the world. Text contained in an electronic image can also be converted from graphical form to a text file by optical character recognition (OCR) software, allowing the text to be easily edited or manipulated.

Flat bed image scanners may be used to easily scan an entire document in one pass, but are typically large, desk bound machines which are not easily portable. Smaller portable hand-held scanners have become more prevalent, allowing a near-pocket size device to scan a document in multiple passes which are then stitched together to form a single image file representing the entire document.

Digital cameras are well-known in the art and are analogous to ordinary film-type cameras, except that the film is replaced with an electronic photosensor (e.g., a two-dimensional CCD array). The electronic photosensor array converts the light received by the camera into electronic signals, which may be digitized and stored as digital image data. For example, the resulting digital image data may be stored in an electronic memory system, such as random access memory (RAM), or may be stored on a magnetic or optical disk of the type commonly used to store digital data.

Digital cameras offer considerable advantages over conventional film-type cameras in that the digital image data may be stored, processed, and/or reproduced with ease. The relative ease of handling and processing the digital image data produced by digital cameras allows users to readily enlarge, reduce, or otherwise modify the digital image data to create any of a wide; range of photographic effects and styles, as well as to easily capture the image of a document and convert text in the image to a text file.

However, digital cameras and portable scanners do have disadvantages. As they become smaller, more portable, and easier to use, it becomes increasingly more difficult to properly align them over the document. If the imaging device is tilted with respect to the document, the resulting image is distorted and OCR software is less effective at recognizing and converting text in the image. Digital cameras held in the air over a document are particularly difficult to align perpendicularly with a document. Portable scanners are somewhat easier, to align, since they may be placed against the document. However, the scan head of a portable scanner may be several inches long but only about an inch wide, allowing the portable scanner to rock back or forth during the scanning motion. This causes the optical axis of the scanner to tilt with respect to the document which may distort the final image.

An exemplary imaging device 10 is illustrated in FIG. 1 as it may be used in document imaging. The imaging device may comprise any type of electronic imaging device which may be used for document imaging, such as a portable scanner. The exemplary embodiment of an imaging device 10 illustrated in FIG. 1 comprises a digital camera.

The imaging device 10 illustrated in FIG. 1 is held over an object, such as a document 20, in the hand 22 of a user. The user has positioned the imaging device 10 but has oriented it at an angle with respect to the document 20. Image light (e.g., 32 and 34) is reflected from the document 20 into the optical system 44 of the imaging device 10.

The optical axis 24 of the imaging device 10 is aligned normally with the housing or body portion 42 of the imaging device 10, i.e., the housing 42 and the optical system 44 are tilted together at the same angle 30. In contrast, the optical axis 124 of the imaging device 110 illustrated in FIG. 2 has been vertically oriented to prevent distortion of the resulting document image.

The tilted optical axis 24 shown in FIG. 1 illustrates the normal operation of a typical digital camera when it is improperly oriented, or the operation of an imaging device 10 according to a presently preferred embodiment having a locking device in place to secure the optical system 44 to the housing 42, as will be described in more detail hereinafter.

The image light 32 reflected to the optical system 44 from the area 50 between the left side 46 of the target region and the optical axis 24 will form the left half of the resulting document image (not shown). The image light 34 reflected to the optical system 44 from the area 52 between the right side 54 of the target region and the optical axis 24 will form the right half of the resulting document image. The imaging device 10 shown in FIG. 1 is tilted in the users hand 22, causing the optical axis 24 to form a non-zero angle 30 with respect to the vertical axis 26 which is perpendicular to the document 20. As a result of this non-zero angle 30, the left area 50 has a width 36 which is greater than the width 40 of the right area 52. In the resulting document image, the left area 50 and the right area 52 will appear as the same size, each forming half of the final image. The tilted imaging device 10 will compress the larger left area 50 into the same space in the final image as the smaller right area 52. Therefore, text or images nearer the left side 46 of the document 20 will appear smaller, or compressed, when compared with text or images nearer the right side 54.

Figure 2:
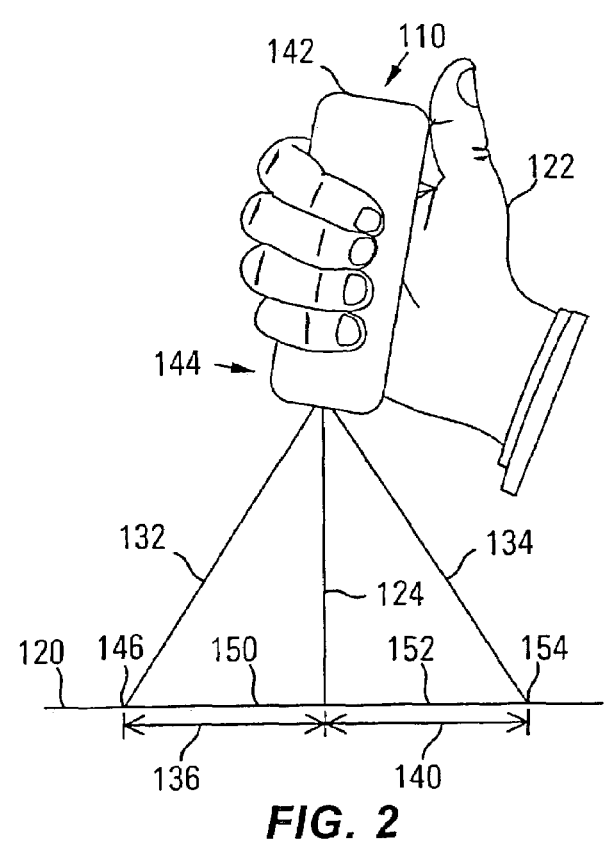
FIG. 2 is a front view of the digital camera of FIG. 1 wherein the image light optical axis has a vertical orientation.

A preferred embodiment of an imaging device 110 for document imaging having a gimbaled or otherwise pivoting optical system 144 is shown in FIG. 2. The camera body 142 is held in the users hand 122 over a document 120. The optical system 144 is mounted to the camera body or housing 142 on a gimbal or other pivoting mounting bracket (not shown), to be described in more detail hereinafter. The mounting bracket allows the optical system 144 to pivot under the force of gravity independent of the tilt angle of the housing 142, within a range of tilt angles which may be inadvertently caused during normal document imaging operations. The mounting bracket may allow the optical system 144 to pivot either along one or two axes within the camera housing 142 according to various embodiments.

Although the camera housing 142 is tilted and is not held vertical or perpendicular with respect to the document 120, the optical system 144 is pulled into a vertical orientation by gravity inside the camera housing 142. When the document 120 is placed on a level, horizontal surface below the imaging device 110, the optical axis 124 of the pivoted optical system 144 is perpendicular to the document 120. The resulting document image will therefore be undistorted by the angle of the housing 142.

The left document area 150 between the left side 146 and the optical axis 124 is reflected in image light 132 on the left side, and the right document area 152 between the right side 154 and the optical axis 124 is reflected in image light 134 on the right side. Since the optical axis 124 is perpendicular to the document, the width 136 of the left area 150 is equal to the width 140 of the right area 152, and the image of the document 120 will be captured properly, without compression or distortion.

Before describing an imaging device 10 for document imaging having a gimbaled or otherwise pivoting optical system in more detail, an exemplary digital camera and portable scanner which may employ a pivoting optical system will be described. However, it is important to note that the gimbaled or otherwise pivoting optical system may be employed in any imaging device for document imaging, and should not be viewed as limited to the exemplary devices discussed herein.

With the foregoing considerations in mind, a digital camera 210 (FIG. 3) may comprise a main body portion 242 which is sized to receive the various systems and components required by the digital camera. For example, in the embodiment shown and described herein, the body 210 is sized to receive the optical system 244, a pivoting optical system mounting bracket 264, and electronic systems such as a controller and memory 258 to process and store the image data. It is generally preferred, but not required, that the controller and memory 258 of the digital camera 210 include an image processing system to allow the image data collected by the camera to be processed independently, i.e., without having to connect the camera to a separate computer or other such device to process and format the image data. The body 242 may also be sized to receive a power source 256 such as a battery. The digital camera 210 preferably includes an illumination system such as a flash mounted on the outside of the body 210. Each of the foregoing systems and devices will now be described in detail.

The main body or housing 242 of the digital camera 210 may comprise a generally rectangularly shaped structure sized to receive the various internal components of the camera 210. For example, in the embodiment shown and described herein, the main body 210 is sized to receive the various electronic components comprising the power source 256, controller and memory 258, pivoting mounting bracket 264, and optical system 244. The body 210 may also be sized to receive other components, such as a battery system 256 and a portable media mass data storage system 258 (e.g., a magnetic floppy disk drive or an optical disk drive (not shown)) to allow image data produced by the digital camera 210 to be stored on portable media (e.g., a magnetic or optical disk). However, since digital cameras and camera bodies are well-known in the art and could be easily provided by persons having ordinary skill in the art after having become familiar with the teachings of the present invention, the main body 242 utilized in one preferred embodiment of the present invention, as well as the various ancillary systems and devices (e.g., battery systems and media recording systems) that may be utilized in one preferred embodiment of the present invention will not be described in further detail herein.

The optical system 244 may comprise a lens assembly 262 and an image sensor 260. The lens assembly 262 collects and focuses on the image sensor 260 image light 232 and 234 reflected by the object or document 220. The image sensor 260 in turn produces image data (not shown) that are representative of the image light 232 and 234 reflected by the document 220. The image data (not shown) produced by the image sensor 260 may be directed to the controller and memory 258.

The lens assembly 262 may comprise any of a wide range of lens assemblies that are well-known in the art and readily commercially available. For example, in one preferred embodiment, the lens assembly 262 may comprise a lens assembly available from Pentax of Japan. The lens assembly 262 may be mounted to the optical system 244 according to any of a wide variety of mounting systems and methods well-known in the art. The image sensor 260 may be mounted to a printed wiring board (not shown) that may be secured within the optical system 244 of camera 210. The image sensor 260 may comprise a two dimensional photo-sensor array of the type that is well-known in the art and readily commercially available. Consequently, the present invention should not be regarded as limited to any particular type of image sensor 260. However, by way of example, in one preferred embodiment, the image sensor 260 may comprise a two dimensional CCD array.

Since optical systems of the type utilized in digital cameras are well-known in the art and readily commercially available, and since a detailed description of the optical system is not required to understand or practice the present invention, the optical system 244 and related components (e.g., lens assembly 262 and image sensor 260) that may be utilized in one preferred embodiment of the present invention will not be described in further detail herein.

The optical system 244 may be mounted to the interior of the camera body 242 using a pivoting mounting bracket 264. For example, the pivoting mounting bracket 264 may comprise a gimbal ring 266 mounted to the camera body 242 on two opposite sides by outer mounting pins 268, while the optical system 244 is mounted inside the gimbal ring 266 on two opposite sides by inner mounting pins 270. The outer mounting pins 268 and inner mounting pins 270 form two axes at right angles to each other, allowing the gimbal ring 266 to pivot along one axis inside the camera body 242, and the optical system 244 to pivot along another axis at right angles to the first inside the gimbal ring 266. As the camera tilts, the optical system 244 may remain in a vertical orientation, since the inner and outer mounting pins 270 and 268 allow the optical system 244 to pivot in all directions.

A flash (not shown) may also be mounted to the exterior surface of the camera body 242 to uniformly illuminate the document 220. The flash may comprise any suitable illumination device, such as an incandescent bulb.

The gimbaled or otherwise pivoting optical system may also be employed in a portable scanner (not shown). A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by placing the portable scanner against the object and sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to direct and focus the image of the illuminated scan line onto the surface of the detector.

The photosensitive detector used to detect the image light focused thereon by the optical system may be a charge-coupled device (CCD), although other devices may be used.

Although a portable scanner does not capture the entire image of a document simultaneously, the image can be distorted or compressed as with a digital camera if the portable scanner is tilted or rocked back and forth during the scanning operation. By mounting the optical system in a gimbaled or otherwise pivoting mounting bracket, the optical system can be maintained in an orientation perpendicular to the document even when the portable scanner is improperly tilted.

Having generally described a gimbaled optical system as it may be used in a digital camera or a portable scanner, the gimbaled or otherwise pivoting optical system will now be described in more detail.

Figure 3:
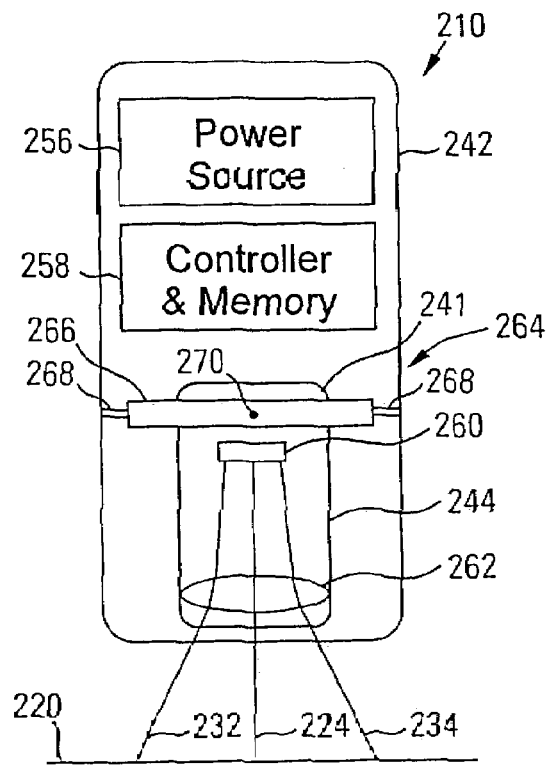
FIG. 3 is a diagram of a digital camera as it may be used for document imaging.
Figure 4:
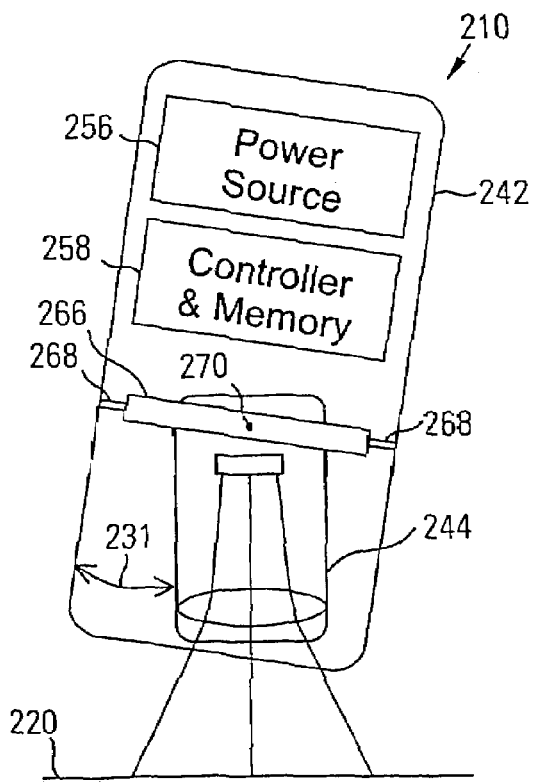
FIG. 4 is a diagram of the digital camera of FIG. 2 having a tilted orientation.

Referring now primarily to FIGS. 3 and 4, a presently preferred embodiment of a digital camera 210 may comprise an optical system 244 mounted on a gimbal 264. The gimbal 264 may comprise a gimbal ring 266 mounted to the camera body 242 on two opposite sides by outer mounting pins 268, while the optical system 244 is mounted inside the gimbal ring 266 on two opposite sides by inner mounting pins 270. The outer mounting pins 268 and inner mounting pins 270 form two axes at right angles to each other, allowing the gimbal ring 266 to pivot along one axis inside the camera body 242, and the optical system 244 to pivot along another axis at right angles to the first inside the gimbal ring 266. As the camera tilts, the optical system 244 may remain in a vertical orientation, since the inner and outer mounting pins 270 and 268 allow the optical system 244 to pivot in all directions.

The optical system 244 is mounted to the gimbal ring 266 near an upper end 241 of the optical system 244 so that the center of gravity of the optical system 244 lies below the gimbal mounting bracket 264. This allows the force of gravity to pull the optical system 244 into a vertical orientation, keeping the optical axis 224 perpendicular to the document 220. As illustrated in FIG. 4, as the camera body or housing 242 is tilted, the optical system 244 remains vertical, forming a non-zero angle 231 between the optical system 244 and the housing 242 of the camera 210.

The gimbal 264 may have either one or two pivotable axes. For the preferred embodiment illustrated in FIGS. 3 and 4, the gimbal 264 has two pivotable axes along the inner and outer mounting pins 270 and 268, which are located at right angles to each other. If the camera 210 is tilted to the right as shown in FIG. 4, the housing 242 and gimbal ring 266 tilt, and the optical system 244 remains vertical by pivoting about the inner mounting pins 270 inside the gimbal ring 266. If the camera 210 were tilted into the page, the housing 242 would tilt, and the gimbal ring 266 and optical system 244 would remain vertical by pivoting together about the outer mounting pins 268. Normally, the camera 210 will not be tilted along only one of the axes established by the inner and outer mounting pins 270 and 268, thus the gimbal ring 266 and optical system 244 will pivot about both axes simultaneously to remain vertical.

The digital camera 210 may also comprise a flexible cable (not shown) connecting the image sensor 260 in the optical system 244 to the controller and memory 258 in the housing 242, so that a non-zero angle 231 between the optical system 244 and the housing 242 will not break the connection. The digital camera 210 may also comprise any suitable connection method for transferring image data between the optical system 244 and systems in the housing 242, such as wireless transmission or rotating electrical connections in the mounting pins 268 and 270.

The gimbaled or otherwise pivotable mounting bracket (e.g., 264) may be damped to prevent oscillations during use. For example, the mounting pins 268 and 270 may be tightly mounted so that friction is high enough to allow the desired pivoting action while preventing oscillation. Alternatively, a viscous fluid may be placed between moving parts in the bracket to slow the pivoting action. Any suitable damping means now known or that may be developed in the future may be applied to the bracket as needed, according to the design requirements of the imaging device.

Another embodiment of a gimbal mounted optical system is illustrated in FIG. 5. A digital camera 310 may comprise a housing 342, in which an optical system 344 is mounted on a gimbal 364. A gimbal ring 366 is mounted to the inside of the housing 342 on outer mounting pins 368 which allow the gimbal ring 366 to pivot back and forth around an X axis. The optical system 344 is mounted inside the gimbal ring 366 on inner mounting pins 370 which allow the optical system 344 to pivot back and forth around a Y axis.

The gimbal mounted optical system may also comprise a lock having an unlocked position (shown in FIG. 5) and a locked position. The lock comprises a locking rod 374 which may be pressed and held against a semi-spherical dome 372 to frictionally hold the optical system 344 in position. When the rod 374 is pressed against the dome 372, the lock is in the locked position and the optical system 344 is prevented from pivoting. When the rod 374 is retracted from the dome 372, the lock is in the unlocked position and the optical system may freely pivot about the inner and outer mounting pins 370 and 368 under the pull of gravity. The optical system 344 is mounted in the gimbal 364 at an upper end 341 of the optical system, so that the center of gravity of the optical system lies below the gimbal 364. The dome 372 is attached to the optical system 344 just above the gimbal 364. As a result, as the optical system 344 pivots on the gimbal 364, the surface of the dome 372 slides about like a rotating ball, but does not shift position. The locking rod 374 may therefore contact the dome 372 at the same location, regardless of how the optical system 344 is tilted.

The lock allows the digital camera 310 to be used in non-vertical applications, such as photographing scenery. The lock may be moved into the unlocked position when using the camera 310 for document imaging, allowing the optical system 344 to pivot into a vertical orientation. The lock may then be moved into the locked position, preventing the optical system 344 from pivoting so that the camera 310 may be raised into a horizontal or other orientation.

The optical system 344 and dome 372 may be formed as a single integral unit, with the image sensor (not shown) located in either the optical system 344 or the dome 372. Alternatively, the optical system 344 and dome 372 may comprise independent elements and may be fastened together with any suitable means, such as an adhesive layer. The various elements of the digital camera 310 may be fabricated of any suitable material, such as plastic or metal. The moving parts of the gimbal 364 may be made of low friction materials to facilitate pivoting, or may be made of higher friction materials to dampen the pivoting action.

In another embodiment illustrated in FIGS. 6 and 7, a digital camera 410 may comprise an optical system 444 mounted in a housing 442. The optical system 444 is pivotally attached to the housing 442 with a ball and socket bracket 476. An extension arm 480 is connected at one end to the housing 442, while the other end is connected to a socket 479. The socket 479 comprises a spherical interior sized to fit a ball 478, allowing the ball 478 to fit within the interior and rotate without shifting. The bottom portion of the socket 479 is left open to allow a support arm 481 connected to the ball 478 to extend down from the ball 478.

The size of the open bottom of the socket 479 may be varied by those skilled in the art according to several design considerations. The spherical interior of the socket 479 should remain just larger than a semi-sphere in order to hold the ball 478 in the socket, preventing the ball 478 from dropping out the bottom of the socket 479. A large opening in the socket will allow the support arm 481 to swivel around larger angles, correcting for larger camera orientation angles. The size of the opening is preferably optimized to allow the ball 478 to be snapped into the socket 479 under pressure, but to prevent the ball 478 from falling out of the socket 479 under normal operating conditions.

The fit between the ball 478 and socket 479 may also be varied to vary the ease with which the optical system 444 may pivot. To dampen and slow the pivoting action, the fit between the ball 478 and socket 479 may be made relatively tight. To allow the optical system 444 to pivot more freely, the fit between the ball 478 and socket 479 may be made loose. Several considerations should be taken into account during design, such as weight of the optical system 444, materials used in the ball 478 and socket 479, the operating environment of the camera 410, etc.

The housing 442 is sized to accept the optical system 444 and ball and socket bracket and to allow the optical system 444 to pivot or swing inside the housing 442. The range of motion allowed the optical system 444 may vary according to the needs of the camera designer and manufacturer. For example, to correct only small errors in orientation, the housing 442 may be formed with little extra space for the optical system 444 to swing. Alternatively, to allow the optical system 444 to swing more freely to correct greater errors in orientation, a greater amount of extra space should be included between the optical system 444 and the housing 442.

The digital camera 410 may also comprise a locking arm 474 which may pass through a hole 482 in the socket 479. The locking arm 474 may then be pressed against the ball 478, frictionally restricting its rotation in the socket 479 and locking the optical system 444 in place. The locking arm 474 may best be seen in FIG. 7 as it passes through the hole 482 in the socket 479. The locking arm 474 may comprise a simple rod passing from the exterior of the housing 442 through the hole 482 in the socket 479, allowing a user to press and hold the end of the locking arm 474. Alternatively, a locking assembly (not shown) may be used to move the locking arm 474 between the locked and unlocked positions and to hold the locking arm 474 in place.

The digital camera 410 may also comprise an image sensor 460, lens assembly (not shown), and other components mounted in the optical system 444 and in the housing 442 as needed.

Figure 8:
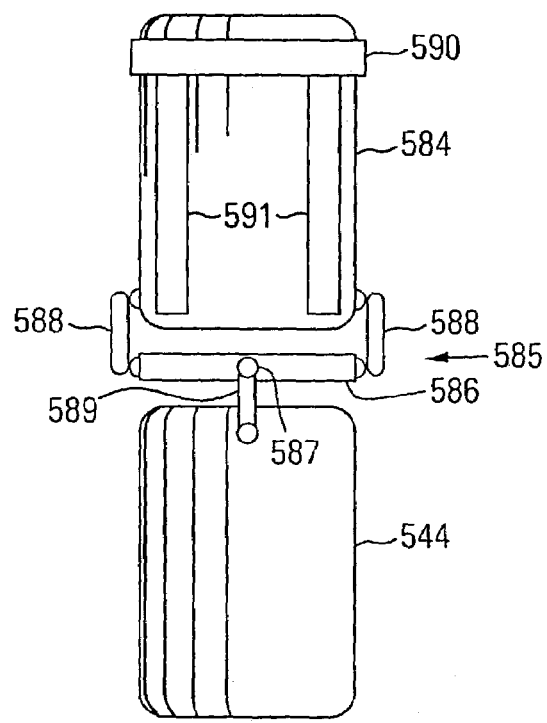
FIG. 8 is a front view of a gimbal mounted optical system with a ring and finger lock assembly in the unlocked position.
Figure 10:
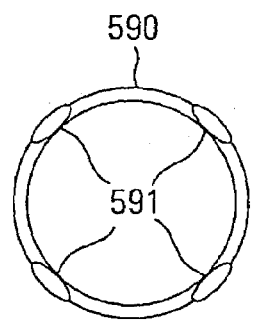
FIG. 10 is a bottom view of the ring and finger lock assembly of FIG. 7.
Figure 9:
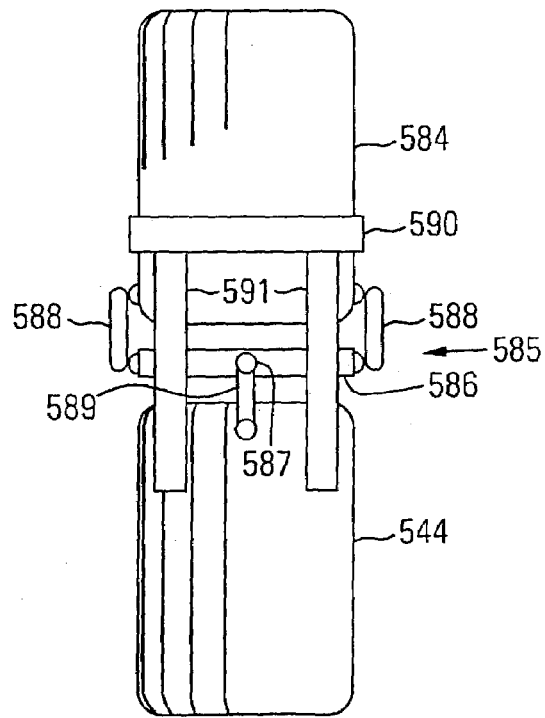
FIG. 9 is a front view of the gimbal mounted optical system of FIG. 7 with the ring and finger lock assembly in the locked position.

Referring now to FIGS. 8, 9, and 10, a digital camera may comprise a lock base 584 fixedly mounted inside the housing of the digital camera. An optical system 544 may be pivotally mounted below the lock base 584 with a gimbal bracket 585, allowing the optical system 544 to pivot and swing inside the housing.

The gimbal bracket 585 may comprise a first gimbal arm 586 having a width substantially equal to the width of the lock base 584. The first gimbal arm 586 may be pivotally mounted to the lower end of the lock base 584 on first gimbal supports 588. A second gimbal arm 587 may be pivotally mounted at right angles to the first gimbal arm 586, and the optical system 544 may be mounted is below the second gimbal arm 587 on second gimbal supports 589. As the camera is tilted, the housing (not shown), and the fixedly attached lock base 584 tilt along with it. The optical system 544 pivots on the gimbal bracket 585 to remain in a vertical orientation. The first gimbal arm 586 allows the optical system 544 to pivot along one axis, while the second gimbal arm 587 allows the optical system to pivot along another axis at right angles to the first, providing full motion around the long axis of the camera.

The gimbal elements may correspond to any known gimbal types or to any developed in the future. They may be designed with a stiff action to dampen oscillations in the optical system 544 relative to the housing, or may be left looser to facilitate pivoting. A separate dampening mechanism, such as a viscous fluid between moving parts, may also be included as desired.

The digital camera may also include a lock, comprising a slide ring 590 sized to fit over the lock base 584 and to slide up and down it. The slide ring 590 has at least one locking fingers 591 extending down from it, spaced to fit snugly around the sides of the optical system 544 when the lock is in the locked position. In a preferred embodiment, four locking fingers 591 extend down from the slide ring 590, as seen from the bottom in FIG. 10.

The at least one locking fingers 591 may alternatively engage in at least one hole (not shown) in the top of the optical system 544 to prevent the optical system 544 from pivoting.

When in the unlocked position (see FIG. 8), the slide ring 590 is positioned near an upper end of the lock base 584, and the attached locking fingers 591 lie alongside the lock base 584. When in the locked position, the slide ring is slid down the lock base 584 to rest near a lower end of the lock base 584, causing the locking fingers 591 to extend down between the gimbal arms 586 and 587 to fit around the sides of the optical system 544, as illustrated in FIG. 9. The optical system 544 is thereby held in position relative to the lock base 584 and to the housing, preventing it from pivoting under the force of gravity.

To move the slide ring 590 up and down the lock base 584, a slide lever (not shown) may connect to the slide ring 590 and extend to the exterior of the camera housing, allowing a user to manipulate the slide ring 590. The slide ring 590 is preferably sized to fit snugly over the lock base 584, preventing it from inadvertently shifting.

Figure 11:
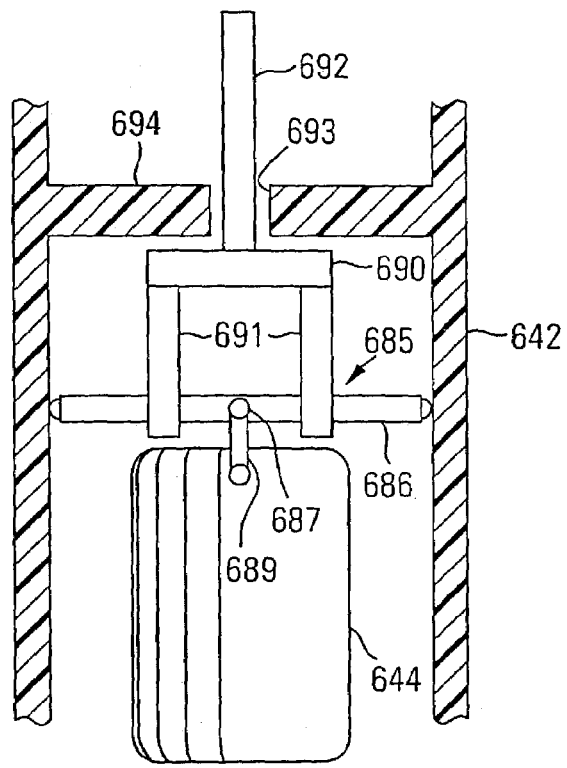
FIG. 11 is a front view of a gimbal mounted optical system with a plunger lock assembly in the unlocked position.
Figure 12:
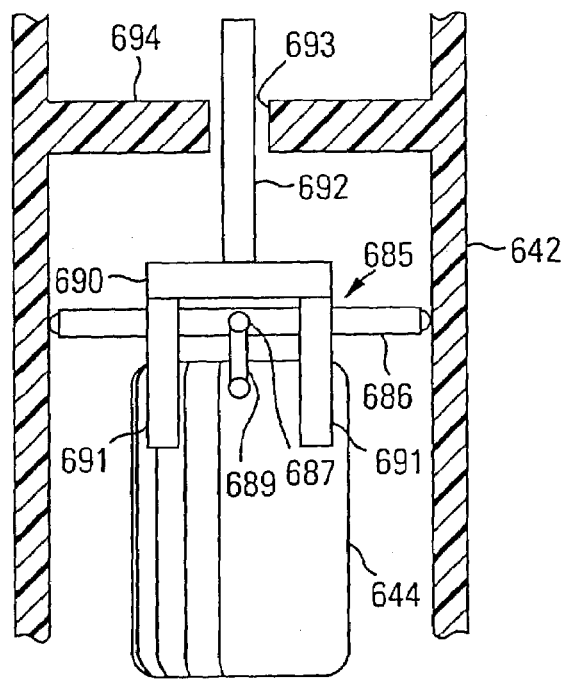
FIG. 12 is a front view of the gimbal mounted optical system of FIG. 10 with the plunger lock assembly in the locked position.

Referring now to FIGS. 11 and 12, another embodiment of a digital camera may comprise an optical system 644 mounted to a housing 642 by a gimbal bracket 685. The gimbal bracket 685 may comprise a first gimbal arm 686, pivotally attached at two ends to the housing 642. A second gimbal arm 687 may be pivotally attached at right angles to the first gimbal arm 686 near a midpoint. The optical system 644 may be suspended below the second gimbal arm 687 by a pair of gimbal supports 689. The optical system 644 may thereby pivot freely about the gimbal bracket 685 inside the housing 642.

The digital camera may also comprise a lock mechanism, comprising at least one locking arms 691 spaced to fit around and engage with the sides of the optical system 644. The locking arms 691 may be supported by a lock ring or disk 690 located above the optical system 644. The lock ring is actuated by a plunger 692 which may be depressed to slide the locking arms 691 between the gimbal arms 686 and 687 and around the sides of the optical system 644. To support and position the plunger 692, a guide hole 693 may be located in a horizontal wall member 694 above the optical system 644, allowing the plunger 692 to move up and down between the locked and unlocked positions without shifting from side to side.

Figure 13:
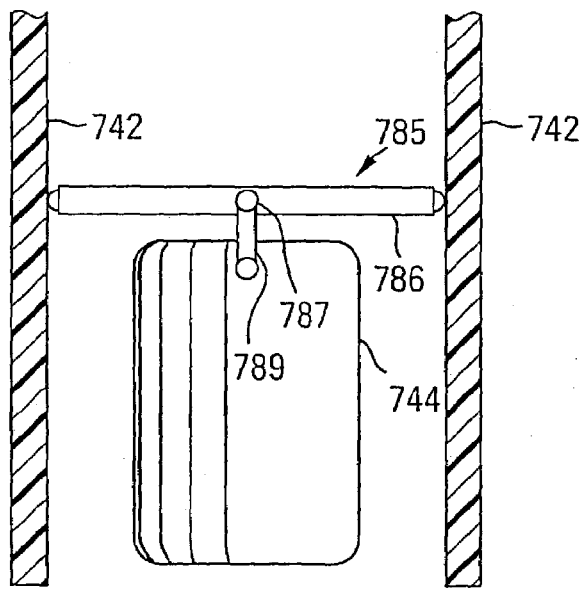
FIG. 13 is a front view of a gimbal mounted optical system.
Figure 15:
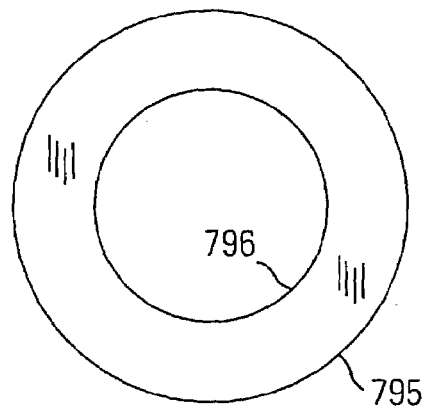
FIG. 15 is a bottom view of the locking ring cap of FIG. 13.
Figure 14:
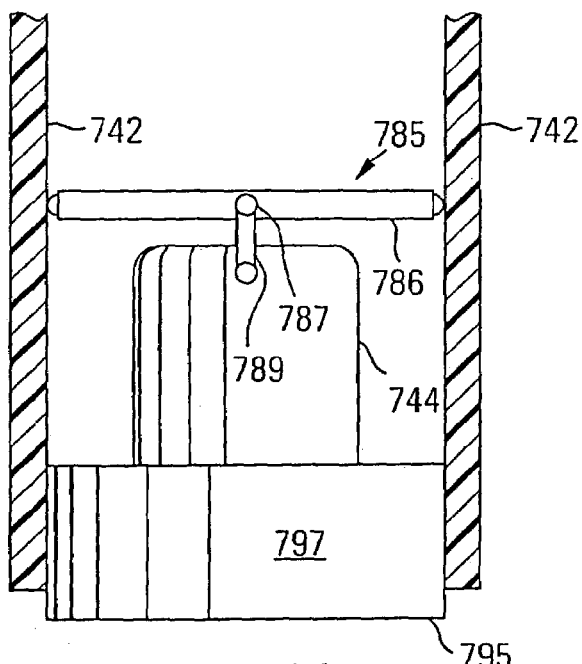
FIG. 14 is a front view of the gimbal mounted optical system of FIG. 12 with a locking ring cap attached.

In another embodiment illustrated in FIGS. 13, 14, and 15, a digital camera may comprise an optical system 744 pivotally mounted to a housing 742 on a gimbal bracket 785. The gimbal bracket 785 may comprise a first gimbal arm 786, pivotally mounted at two ends to the housing 742 or another support member fixedly located within the housing 742. A second gimbal arm 787 may be pivotally attached at right angles to the first gimbal arm 786, allowing the gimbal bracket 785 two degrees of motion within the housing 742. The optical system 744 may be suspended below the gimbal bracket 785 by a pair of gimbal supports 789 pivotally attached near the ends of the second gimbal arm 787. As discussed previously, the housing 742 is large enough to leave empty space between the housing 742 and the optical system 744, allowing the optical system 744 to freely pivot inside the housing 742.

In an alternative embodiment, the optical system 744 may be pivotally mounted inside the housing 742 with one or more hinges (not shown), allowing the optical system 744 to pivot in one or more directions, depending upon the number of hinges used.

The digital camera may also comprise a locking ring cap 795. The locking ring cap comprises a ring with a side wall 797 defining a center hole 796 through which image light may pass. The locking ring cap 795 may be placed around the lower end of the optical system 744 so that it fills the empty space between the optical system 744 and the housing 742 in at least three spaced apart locations, in order to prevent the optical system 744 from swinging in any direction within the housing 742. When the locking ring cap 795 is placed upon the camera, optical light may pass through the center hole 796 in the cap 795 to reach the optical system 744.

The locking ring cap 795 is preferably sized to fit snugly between the optical system 744 and the housing 742 so that it prevents pivoting and so that it will not fall off of the optical system 744 if jarred or bumped. Alternatively, corresponding ridges and valleys in the ring cap 795 and the optical system 744 or housing 742 may engage when the cap 795 is in the locking position, preventing the cap 795 from inadvertently falling from the camera. The side wall 797 of the locking ring cap 795 may also be beveled near the top to facilitate insertion around the optical system 744.

The locking rings and cap disclosed herein have the advantage of centering the optical system within the housing, simplifying image composition, and providing positive engagement to securely lock the optical system in place. The frictional locking arms, in contrast, may lock the optical system at any desired angle, but do not provide positive engagement, thus provide a less secure lock.

While presently preferred illustrative and exemplary methods of pivotally mounting the optical system (e.g., 44) in a camera housing (e.g., 42) have been disclosed, the optical system 44 may be mounted in the housing 42 with any suitable pivoting bracket now known, or which may be developed in the future, without departing from the inventive concepts disclosed herein. Therefore, the gimbal optical system for document image capture should not be regarded as limited to the brackets described in detail. It is to be understood that the inventive concepts may be otherwise variously embodied and employed, and that the appended claims are intended to be construed to include such variations, except as limited by the prior art.

What is claimed is:

1. An imaging device for document imaging, comprising:
a body portion;
an optical assembly;
a pivotal mounting bracket; whereby said optical assembly is pivotally mounted to said body portion;
a lock having a locked position and an unlocked position, whereby said optical assembly may be locked into place relative to said body portion when said lock is in said locked position, and where said optical assembly may pivot about said pivotal mounting bracket when said lock is in said unlocked position,
and wherein said lock comprises at least one locking fingers operatively associated with said body portion, said at least one locking fingers engaging with said optical assembly when said lock is in said locked position to hold said optical assembly in place relative to said body portion.

2. An imaging device for document imaging, comprising:
a body portion;
an optical assembly;
a pivotal mounting bracket, whereby said optical assembly is pivotally mounted to
said body portion;
a lock having a locked position and an unlocked position, whereby said optical assembly may be locked into place relative to said body portion when said lock is in said locked position, and where said optical assembly may pivot about said pivotal mounting bracket when said lock is in said unlocked position,
wherein said pivotal mounting bracket comprises a gimbal;
and wherein said lock comprises a ring cap comprising a ring which may be slid around said optical assembly to rest between said optical assembly and said body portion, preventing said optical assembly from moving relative to said body portion.

* * * * *

UNITED STATES PATENT AND TRADEMARK OFFICE
CERTIFICATE OF CORRECTION

| | | |
|---|---|---|
| PATENT NO. | : 7,253,838 B2 | Page 1 of 1 |
| APPLICATION NO. | : 10/454194 | |
| DATED | : August 7, 2007 | |
| INVENTOR(S) | : Thomas C Oliver | |

It is certified that error appears in the above-identified patent and that said Letters Patent is hereby corrected as shown below:

In column 11, line 10, after "mounted" delete "is".

In column 13, line 14, in Claim 1, after "bracket" delete ";" and insert -- , --, therefor.

Signed and Sealed this

Twenty-eighth Day of April, 2009

JOHN DOLL
*Acting Director of the United States Patent and Trademark Office*